Dec. 12, 1961 C. H. SCHAAR 3,012,918
DIFFERENTIAL HEAT-SEALABILITY IN DIFFERENTIALLY CRYSTALLINE
SHEET MATERIALS, PRODUCTS MADE THEREFROM
AND PROCESS AND APPARATUS FOR MAKING
Filed June 20, 1956 2 Sheets-Sheet 1
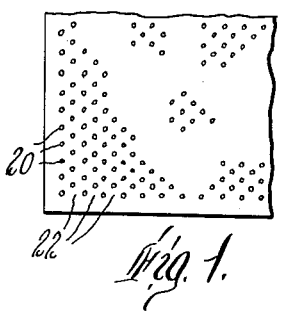
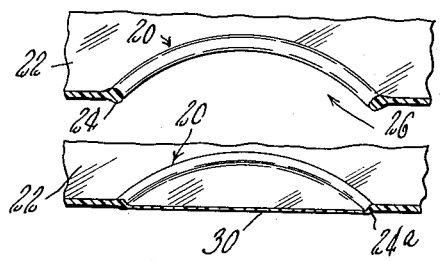
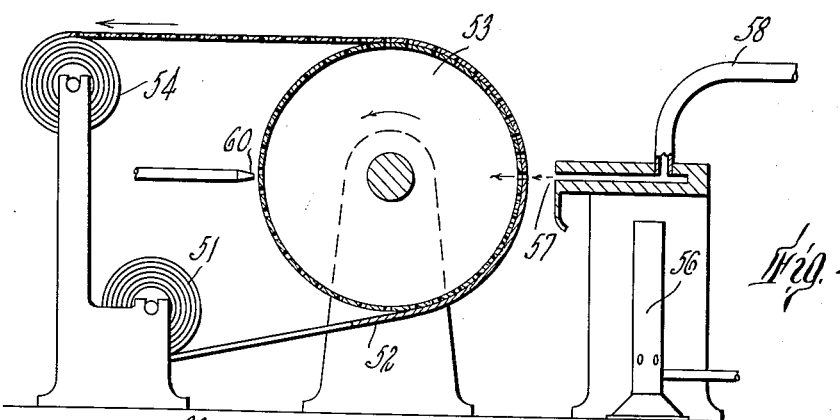

United States Patent Office 3,012,918
Patented Dec. 12, 1961

3,012,918
DIFFERENTIAL HEAT-SEALABILITY IN DIFFERENTIALLY CRYSTALLINE SHEET MATERIALS, PRODUCTS MADE THEREFROM AND PROCESS AND APPARATUS FOR MAKING
Charles H. Schaar, Chicago, Ill., assignor to The Kendall Company, Boston, Mass., a corporation of Massachusetts
Filed June 20, 1956, Ser. No. 592,657
14 Claims. (Cl. 154—46)

This invention relates to sheets, including films, of polymeric materials and particularly to sheets which have certain differential characteristics in selected portions of at least one surface thereof. More particularly the sheets of this invention are constituted of polymeric materials which normally exhibit a substantial crystalline structure but are also capable of co-existing, at least temporarily, in a substantially amorphous condition.

The invention also relates to methods and apparatus for making such sheets and to the production of sheets provided with holes or perforations in any desired number, size or arrangement, which sheets may or may not have the above-described properties of co-existing crystallinity and relative non-crystallinity.

It is a primary object of this invention to provide in a single sheet of polymeric material, surface areas on at least one side thereof which are substantially crystalline and other surface areas which are less crystalline or preferably amorphous in nature of which the less crystalline areas are mechanically satisfactorily heat-sealable either at a lower temperature than the substantially crystalline areas or despite substantial non-sealability of the latter.

As a further incident of the invention the sheet materials hereof may have differential solvent-sealing properties in the less crystalline portions thereof as well as differential heat-sealing properties, although the simplicity of heat-sealing will, by and large, lead one to ignore the solvent-sealing capacity of the sheet.

An additional object of the invention is the provision of a substantially crystalline polymeric sheet comprising a matrix surrounding and supporting segregated areas comprising perforations and grommet-like beads surrounding each of said perforations which beads may have a degree of crystallinity substantially the same or approaching that of the matrix or alternatively may be less crystalline or substantially amorphous.

It is a further object of the invention to provide laminar sheets wherein at least one of the sheets is a substantially crystalline polymeric sheet sealed to the other lamina only in discrete areas surrounding perforations in said polymeric sheet.

It is a still further object of the invention to provide a machine and process for obtaining the sheets or laminae of this invention.

A further object of the invention is the provision of heat-sealed packages made from at least one sheet of crystalline polymeric material which under normal conditions is considered non-sealable.

Other objects and advantages of the invention will be apparent in the detailed specification, claims and drawings.

Certain of the sheets of this invention are highly useful because the structure in the amorphous-like selected areas is such that in those areas the sheet has different and improved heat-sealability characteristics, irrespective of whether the sheet in other areas has good heat-sealability characteristics or not. Thus, while some sheets of this invention are formed of polymeric materials which are only difficulty heat-sealable in sheet form, to either themselves or to other material, for example, polyethylene terephthalate, the invention also includes sheets formed from other polymeric materials whose heat-sealability at least to certain materials, such as fibrous materials, can be accomplished at lower temperatures when the material is in a less crystalline state than its normal crystalline state.

Thus, in the case of the first class of polymeric materials, referred to above intricate sealing techniques are no longer required and in the case of the other polymeric materials, heat-sealability can be accomplished at temperatures which do not substantially affect the more crystalline areas of the sheet and thus better retain their useful characteristics in a final heat-sealed laminated structure.

In general, the primary object of the invention is accomplished by producing a sheet material having potential or improved heat- or solvent-sealability in certain selected surface areas thereof, supported and usually surrounded by remaining surface areas of the sheet which are in a less readily sealable state. In this way, desirable characteristics of the remaining areas, such as good heat resistance, solvent-resistance, high tensile strength, abrasion resistance, etc., are present without being sacrificed or impaired for the sole purpose of imparting sealability to the sheet, while, in the selected areas, they can or may be so sacrificed, at least temporarily. These selected areas are constituted of the material of the sheet per se and are not constituted of separately applied coatings or lamina. Nevertheless, the selected areas have satisfactory and lower temperature sealing characteristics, in contrast to the remainder of the sheet.

While the selection of the location of the different areas may follow a large variety of patterns, highly useful patterns comprise those wherein the localized areas are minute and only minutely separated from one another. With such patterns, the sealing, while partaking of the nature of spot welding, occurs at such closely spaced intervals as to create an effective seal over the entire area, sufficient in most cases to qualify as an effectively impervious and hermetic seal, suitable for food, pharmaceutical, surgical and other packaging. On the other hand, it may be desirable in the production of sheets for use in surgical dressings, to produce larger and more widely separated localized areas, particularly surrounding holes in the sheets, whereby when the sheets are sealed to fibrous absorbent material, the absorbency of the latter is largely preserved.

The localized areas may also take a variety of geometric shapes, e.g. polygonal, circular, elliptical, and/or combinations thereof. They may be intermixed in heterogeneous patterns for decorative or other purposes. An included portion of the sheet within the localized area may be a void piercing the sheet and rendering the sheet perforate, both before and after sealing to other materials. In the case of a pierced circular area, the heat-sealing area takes the form of an annular beaded area surrounding the perforation. The patterns may also be varied by varying the size and spacing of the areas, as well as their shapes.

It thus can be seen that a prerequisite of the polymeric materials to be used for making the novel sheets of this invention is that the material can co-exist at least temporarily in two different states, a state with molecular arrangements of reduced order characteristic of amorphous materials and a state having a more orderly arrangement of molecules characteristic of substantially crystalline materials, these two states exhibiting different softening point temperatures and that the difference in softening point temperatures shall be sufficient, i.e., preferably greater than 10° C., so that the sheet, in the areas with the lower softening point temperature, can be thermally softened and rendered sticky and tacky without equivalently thermally softening the remainder of the sheet.

Polymeric materials herein referred to as normally non-sealable in sheet form are those substantially crystalline polymeric materials whose softening or sticking point temperature in sheet form is so close to the distortion point temperature of the sheet, or whose reaction in sheet form to application of tack producing solvents is such that as a practical matter it is impossible without intricate sealing techniques to develop sufficient stickiness and tackiness in any areas of the surface of the sheet to cause its adherence to a similar sheet or to other materials without simultaneously detrimentally distorting or uncontrollably rupturing the sheet as a whole or altering its visual appearance, thereby impairing its commercial utility if not destroying it completely.

An illustrative example of such normally non-sealable sheet material is polyethylene terephthalate particularly in the form which is exemplified by the line of products now sold commercially by E. I. du Pont de Nemours and Company, Wilmington, Delaware, under its trademark Mylar. These products are films comprised essentially of substantially crystalline polyethylene terephthalate. These products will hereinafter be referred to as Mylar polyester film.

In its present day commercial form in sheet calipers running from ¼ mil to 7 mils Mylar polyester film has a very sharp published melting and distortion point temperature at about 250° C. to 255° C. Its surface softening or sticking point temperature is only a few degrees (about 5°) below 250° C., so that application of sufficient heat to cause stickiness to develop at the softening point temperature normally results in such close approach to distortion temperature as to cause the aforementioned effects. Similarly, available solvents cannot develop sufficient stickiness in Mylar polyester film for sealability without also causing similar detrimental effects. These adverse effects increase with increasing thinness of the sheet. Conventional heat sealing or solvent sealing operations have no utility when applied to Mylar polyester film, a fact so generally recognized that the manufacturers of Mylar polyester film have advocated the use of an interposed heat-sealable amorphous polyethylene terephthalate film in heat-sealing operations involving Mylar polyester film, as indicated in U.S. Patent No. 2,719,100.

Other polymeric materials chemically related to polyethylene terephthalate, such as other polyesters, as hereinafter more specifically described, can, like polyethylene terephthalate, co-exist in sheet form with areas in different states of crystallinity. Regardless of whether these related compounds are difficulty heat-sealable in their crystalline form, sheets thereof conforming to this invention may have improved heat-sealable properties in selected areas thereof.

There are also a variety of substantially crystalline polymeric materials in sheet form which, although already in wide commercial heat-sealable use with normal heat-sealing techniques, will have peculiar usefulness when provided with the differential selected surface areas of the sheets of this invention, since by the application of a heat-sealing technique which involves a temperature below the heat distortion point temperature of the sheet as a whole, the sheets can be made to heat-seal only in selected areas thereof and without exposing in the heat-seal operation the remainder of the sheet to heat distortion or softening point temperatures. A description of such materials will also be hereinafter given.

Sheet materials and sealed laminates made therefrom in accordance with this invention may be more fully understood from the following description and the accompanying drawings, in which FIG. 1 is a plan view showing schematically a sheet material of the invention; and FIG. 2 is a highly enlarged detailed cross-sectional schematic perspective view of a portion of the sheet shown in FIG. 1; and FIG. 3 is a similarly enlarged detailed cross-sectional schematic perspective view of a modified form of sheet material of this invention; and FIG. 4 is a diagrammatic representation of one form of apparatus useful in making the sheet materials of FIGS. 2 and 3; and FIGS. 5–9 are greatly enlarged cross-sectional depictions of the nature of various forms of heat-sealable areas in sheets of this invention; and FIG. 10 is a representation of a sheet of this invention heat-sealed to another lamina; and FIG. 11 is a representation of two sheets of this invention heat-sealed to one another with their perforations in register; and FIG. 11a is a representation in cross-section of a sheet of this invention heat-sealed to another lamina with an intervening lamina; and FIG. 12 is a representation of a polyester film having a certain pattern of perforations useful for packaging purposes; and FIG. 13 is a side elevational view of a package formed with the use of 2 layers of the material of FIG. 12; and FIG. 14 is a view similar to that of FIG. 13 showing a modified form of package; and FIG. 15 is a photomicrograph showing in cross-section the edge of a perforation in a 1 mil Mylar polyester sheet of this invention; and FIG. 16 is a photomicrograph of one of the areas depicted in part in FIG. 3; and FIG. 17 is a photomicrograph of one of the areas depicted in part in FIG. 6; and FIG. 18 is a photomicrograph showing in side by side comparison 2 perforated ¼ mil sheets of this invention, one before and one after an optional conditioning treatment, both viewed through one of two crossed polarizing elements between which the sheets are placed.

FIG. 1 represents a sheet of this invention, the entire surface area of which displays a series of localized substantially amorphous surface areas 20 which have different physical characteristics from those of the intervening substantially crystalline areas 22 constituting the matrix of the sheet. In the form of the invention shown by the detail in FIG. 2, each of these localized areas is toroidal in shape and somewhat thicker than the matrix and has the appearance of an annular bead 24 encircling a perforation 26 through the sheet.

These beads 24 serve the double purpose of reinforcing the edges of the perforations and of providing areas having heat and/or solvent sealing characteristics. In their reinforcing function, they may be aptly regarded as grommets.

In the detail of FIG. 3, the structure is modified to the extent that, while the bead 24a is largely present, it encircles, instead of a perforation, a connecting film or membrane 30 of material having a reduced thickness. In these cases, the membrane may have thermal characteristics more nearly conforming to those of the bead material 24a than to those of the remaining portions 22 of the sheet.

The perforations (or the membranes) may be extremely minute. For example, the film of FIGS. 1 and 2, having for example a ¼ mil caliper in the areas 22 may contain perforations slightly less than 20 mils in minimum diameter, and so closely spaced as to provide 714 holes or more per square inch. This example is by no means the ultimate, however, since in very small samples as many as 4,000 holes per square inch of 8 mils diameter each have been made and on an individual basis, holes as fine as 2 mils have been produced. Similar dimensions may be present where, as in FIG. 3, there is no perforation.

Normally, the beads 24 and 24a are constituted wholly or in some part of material displaced into the bead from an area within the bead. Accordingly, the larger the perforation, the larger the volume of the bead. This explains the structure shown in FIG. 3 wherein insufficient amounts of the material of the original sheet within the area of the bead has been displaced to puncture the sheet and, in this case, the beads are therefore formed by displacement of only a part of the intervening material, leaving the remainder 30 in as a thin spanning membrane.

It can thus be seen that, as an extreme, the portion of the sheet within the bead areas may constitute substantially the entire surface area of the sheet, particularly if the perforations or membranes and/or their surrounding beaded areas are for example of hexagonal or other suitable shape so as to interfit with every adjacent beaded area. For optimum mechanical properties, it is much preferred to leave a continuous surface matrix 22 between the beaded areas.

The heat-sealability characteristics in the beads 24 (FIG. 2) or within the beaded area 20 (FIG. 3) can be imparted concomitant to the formation of the beads (or beaded areas) by forming preferably substantially amorphous beads as a consequence of a precisely localized melting of selected areas of a substantially crystalline film followed by quick solidification thereof.

In a true sense then, the production of localized sealable areas on a substantially crystalline sheet is the result of a heat-conditioning treatment precisely applied in preselected localized areas of the sheet, without subjecting the intervening areas of the sheet to the same treatment, so that the intervening areas are not similarly affected. Distortion and/or punctures which are formed in the treated area have definite commercial advantage in that the sheet may have desirable perforation patterns or design patterns, without substantial loss in major portions of the sheet of the original stability and integrity. These qualities are retained by the continuous matrix, along with the desirable solvent-resistant, heat-resistant and other qualities of the original sheet. In this connection, the formation of a bead is of decided advantage in providing reinforcing areas about the apertured structure, thus increasing the tear resistance of the sheet, even when compared to the tear resistance of the unmodified substantially crystalline film.

In any event, precisely localized melting and immediate cooling of pre-selected areas of crystalline sheet material such as Mylar polyester film causes the material within the resulting beaded areas 20 to become less crystalline and even substantially amorphous and thus to acquire surface softening or sticking point temperatures below, and in the case of Mylar polyester film, far below that of the remaining areas 22. For example, in the case of commercial Mylar polyester film having a published melting point temperature of about 250 to 255° C., and incapable of being heat-sealed to itself at any temperature less than 245° C., I have found that the softening point temperature of the surfaces of the localized heat conditioned areas 20, as measured by their ability to be heat-sealed when placed in face-to-face contact without externally applied pressure, is about only 120° C. With pressure, self-sealing and sealing to fibrous materials such as facial tissues has been accomplished at temperatures as low as 107° C.

Thus, by the application of sealing heats to raise the temperature of the treated Mylar polyester film in areas to be sealed to 120° C. or more, but still short of 245° C.—for example, anywhere within the range of 120° C. to 240° C., practical heat-sealing of the film to itself is accomplished, with or without registration of the areas 20 as shown in FIG. 11, or to untreated Mylar polyester film or to any of a variety of other materials such as paper or fibrous fabrics, whether woven, non-woven, knitted, felted or molded, or to non-fibrous materials including metal foils, glass, or other films, as represented by 32 in FIG. 10. Moreover this is accomplished without distortion or melting of the remainder of the sheet i.e., matrix 22, which maintains the general stability and integrity of the sheet as a whole, that is without substantial shrinkage. Such sealing can be readily performed by conventional heat-sealing equipment.

Similarly, when substantially crystalline films of vinylidene chloride-vinyl chloride copolymers obtainable under the trade name "Saran A517" from Dow Chemical Company, Midland, Michigan, and of monochlorotrifluoroethylene polymers, sold under the trade name "Kel-F" and obtainable from basic material manufactured by M. W. Kellogg Company, Battle Creek, Michigan, are treated in accordance with this invention, films are produced with pre-selected, localized, heat-conditioned surface areas which are substantially amorphous. By the application of sealing heats accompanied by moderate pressure, practical heat-sealing of such treated films in the selected localized areas to, for example, fibrous cellulosic webs such as the non-woven fabric sold by The Kendall Company, Walpole, Massachusetts, under the trademark "Webril R," is accomplished at temperatures below which the remaining portions of the sheet will seal to the same fibrous surface. In the case of "Saran A517" film differential sealing is accomplished to "Webril R" non-woven fabric in the localized areas as low as about 130° C., whereas in the remaining areas sealing to "Webril R" non woven fabric cannot be accomplished at a temperature below about 154° C., other conditions being the same. In the case of "Kel-F" film differential sealing is accomplished in the localized areas as low as about 200° C., whereas in the remaining areas sealing to "Webril R" non-woven fabric cannot be accomplished at a temperature below about 215° C., other conditions being the same.

Generally then, by the application of sealing heats to the less crystalline or even substantially amorphous areas of the sheets of this invention at a temperature above the surface softening or sticking temperature of the less crystalline, or even substantially amorphous areas but short of the surface softening or sticking temperature of the more highly and substantially crystalline areas of the sheet, practical heat-sealing of the sheet to a variety of surfaces but particularly to fibrous cellulosic sheets can be accomplished without distortion or melting of the remainder of the sheet. Such sealing can be readily performed by conventional heat-sealing equipment.

FIG. 12 is a view of a substantially crystalline polyester or other thermoplastic film of this invention, wherein the treated areas 20 are confined to certain portions of the sheet only, including the borders and certain spaced transverse areas, the central areas 38 being imperforate. Such a material is useful in forming packages of the type shown in FIG. 13, wherein two of the sheets of FIG. 12 are fed in register to conventional packaging machines, which insert material 40 to be packaged between the two sheets, during or after which the two sheets are heat-sealed to each other around the borders to enclose the packaged material, which may be in any form—solid, granular or even liquid, where the beaded areas interfit sufficiently to form a liquid-tight seal. Subsequently, the strip of packages can be severed medially of the transverse heat-sealed areas to provide individual packaged units or measures.

FIG. 14 shows a similar package, which is made from material similar to that of FIG. 12 with the exception that in the case of FIG. 14, both sheets are perforated throughout their entire areas so that the finished package is perforated throughout and hence in the case of higher melting materials is useful for infusion purposes and may contain food such as tea or coffee. In fact, because of the high melting point of certain polyesters, such as Mylar polyester film, materials contained in a package such as that of FIG. 14 may be boiled in water in the package and thereafter even served in the package. Since this boiling will raise the temperature of the package walls only to 100° C., neither the matrix nor the heat-sealed areas of the walls will be deleteriously affected.

Other polyesters, which exhibit like Mylar polyester film, a crystalline structure and which can co-exist at least temporarily both in substantially crystalline and in substantially amorphous condition and hence are suitable for purposes of this invention, include:

fluoroethylene polymers, a representative example of which is "Kel-F" film.

The breadth of chemical families of polymers included as useful in practicing this invention is further illustrated

| Name | Structural Unit | Published Melting Point |
|---|---|---|
| polytrimethylene terephthalate | −C(=O)−⟨⟩−C(=O)−O−CH$_2$−CH$_2$−CH$_2$−O− | About 221° C. |
| polyethylene 4,4'-diphenyldicarboxylate | −C(=O)−⟨⟩−⟨⟩−C(=O)−O−CH$_2$CH$_2$−O− | About 300° C. |
| polytetramethylene 4,4'-diphenyldicarboxylate. | −C(=O)−⟨⟩−⟨⟩−C(=O)−O−CH$_2$CH$_2$CH$_2$CH$_2$−O− | About 280° C. |
| polyethylene 4,4'-diphenylmethane-dicarboxylate. | −C(=O)−⟨⟩−CH$_2$−⟨⟩−C(=O)−O−CH$_2$−CH$_2$−O− | About 220° C. |
| polyethylene 1,5-naphthalate | −C(=O)−⟨naphthalene⟩−C(=O)−O−CH$_2$−CH$_2$−O− | About 230° C. |
| polyethylene 2,6-naphthalate | −C(=O)−⟨naphthalene⟩−C(=O)−O−CH$_2$CH$_2$−O− | |

As will be seen all of the above materials are chemically related to polyethylene terephthalate and they are all polyesters comprised of one or more aromatic groups and one or more aliphatic groups, the former being derived from a dibasic acid and the latter being derived from a diol. Additionally, however, each of the above polyesters is capable of co-existing at least temporarily at the same temperature in both a crystalline and an amorphous-like state and thus each polyester has the requisite characteristics for materials suitable for purposes of the invention.

Representative vinyl polymers suitable for conversion into highly useful products of this invention are substantially crystalline sheets of polyvinyl fluoride and polyvinyl methyl ether.

Representative of the class of suitable substantially crystalline vinylidene polymers are polymers and copolymers of vinylidene chloride, vinylidene bromide, vinylidene chlorobromide, vinylidene cyanide and vinylidene halocyanides. These monomers may also be copolymerized to form substantially crystalline polymers useful in this invention, with minor amounts of such mono- and di-ethylenically unsaturated monomers as vinyl acetate, vinyl chloride, vinyl bromide, styrene, chlorostyrenes, methyl or ethyl acrylates or methacrylates, butadiene, acrylonitrile, methacrylonitrile, halogen substituted propanes and the line. In general where the monomer to be used as a co-monomer with a vinylidene monomer will not normally form a crystalline polymer alone, it will not form a substantially crystalline copolymer with a vinylidene monomer if used in amounts more than 30% and in some cases in amounts more than 15% of the copolymer. "Saran A517" is a well known example of a suitable vinylidene chloride-vinyl chloride co-polymer film.

A further example of a chemical family of suitable substantially crystalline polymers is that of the chlorotri- by the fact that certain substantially crystalline polyamides such as N-substituted polyamides of the type of N-methylated polydecamethylene adipamide are suitable, as are such polyamides as hexamethylene sebacamide sold commercially as "Nylon 610" by E. I. du Pont de Nemours and Company.

Still further evidence of the breadth of the invention is the fact that certain members of so-called isotactic substantially crystalline polymers, that is those in which the polymer chains contain asymmetric carbon atoms, all of which are of the same steric configuration, are suitable. Examples of such isotactic polymers are isotactic polystyrene, isotactic poly alpha butylene and isotactic polypropylene.

In addition to crystalline polymeric sheets of the types hereinbefore described, the invention also includes crystalline polymeric sheets whose amorphous or amorphous-like state can be produced only by resort to difficultly low temperatures, or whose amorphous or amorphous-like state can be maintained only by storing the sheets at such low temperatures. However, polymeric sheets of the latter types do not have the practical utility of polymeric sheets of this invention in which selected portions thereof in an amorphous state and other portions thereof in a crystalline state can co-exist at room temperatures for periods of time sufficiently long to permit commercial utilization of their differential heat sealability characteristics. Pure polyethylene, for example, is one material having limited utility for the purposes of this invention because it exists in the amorphous state only at subzero temperatures.

The application of heat to the sheet for the purpose of melting the material within the selected localized areas may be accomplished either by conduction, convection or radiation or combinations thereof. When it is desired to puncture the film, the essential action is to melt the material within the localized areas. Precise localization of treatment may be obtained, whether or not perforations are desired, by transfer of heat from a heated fluid, preferably gaseous, while controlling the temperature of different areas of the sheet, so that certain areas of the sheet rise above the melting point of the material thereof, while the material in the intervening areas remains unmelted. Such control may take the form of more rapidly conducting the absorbed heat away from certain areas of the sheet than from other areas, as by the use of a cooled grid over which the sheet is supported during the application of the heat. Such a grid may conveniently be a perforated, pitted or engraved plate, cylinder or other suitable body provided with an interrupted surface. For example, a circumferentially grooved cylinder, or a fine screen may be used. For the production of certain products in which perforations are desired one may utilize hot dies or needles for melting the material within the selected localized areas.

One form of apparatus which may be successfully used in the preparation of sheets of this invention is shown in FIG. 4 of the drawings. The apparatus includes a reel of film material 51 from which the material 52 is fed, usually in single layer form, over a rotating metal cylinder or drum 53, the surface of which is provided with perforations or depressions of the desired dimension and pattern and the film 52 then passes to a take-up roll 54. Opposite the drum there is provided means for directing a jet of heated air onto the surface of the film 52 passing over the drum 53. The jet is so formed that it may be efficiently heated as by a gas flame from a burner 56. The air is directed through the jet orifice 57 under pressure supplied through the pipe 58.

Operation of the apparatus shown in FIG. 4 may be varied according to the particular type of sheet desired. In general, the temperature of the hot air jet should be such as to at least insure melting of certain areas of the sheet during its passage through the air jet. The velocity of the jet should be taken into consideration in connection with the speed of the sheet and the temperature of the jet, the faster the jet velocity the lower the temperature for a given speed of film operation.

Where heat sources other than jet heat are utilized, such as heat from a bank of infrared lamps or from a flame, the velocity of the fluid heat may be much lower or even substantially zero. In the formation of sheets of this invention air jet temperatures as low as the melting point of the material being treated may be used. However, jet temperatures from 260° C. to 875° C. with film speeds running from 4 to 33 yards per minute, depending upon the particular film, are preferred. The grid sizes used in the case of circular holes have varied from 2 mils to ¼ inch in diameter. Obviously the range can be extended.

In the case of ¼ mil Mylar polyester film, the jet orifice was 25 mils wide and 9 inches long, the gauge air pressure was about 30 pounds per square inch, the drum 53 was approximately 4 inches in diameter and in one case, for example, contained about 237 holes per square inch on uniformly spaced centers affording an open area of approximately 21% with each hole being approximately 33 mils in diameter. The temperature of the air as it issued from the jet was approximately 370° C. At this temperature, the film 52 was fed through the apparatus at approximately 7 yards per minute, the space between the orifice and the grid roll being approximately ¼ inch (shown proportionately enlarged in FIG. 4). A cooling jet 60 is directed against the back surface of the drum 53 and is operated to maintain the surface of the drum preferably at approximately 55 to 70° C.

When treating ¾ mil "Saran" film, the same drum, the same distance from drum to orifice and the same jet orifice were used as those described above in the case of Mylar polyester film, but the gauge air pressure was 18 pounds per square inch with the temperature of the air as it issued from the jet at approximately 235° C. The film in this instance was fed through the apparatus at approximately 1.7 yards per minute with the cooling jet maintaining the surface of the drum in the same range of temperatures as described above for the Mylar polyester film.

When treating "Kel-F" film in 2 mil thickness, the orifice size was changed to 35 mils wide by 5 inches long, the distance from drum to orifice was reduced to ⅛ inch and a 4" diameter drum with holes approximately 250 mils in diameter and 8 holes per square inch was used. The gauge air pressure was 35 pounds per square inch, while the temperature of the air as it issued from the jet was approximately 425° C. The film in this instance was fed through the apparatus at approximately 2 yards per minute with the cooling jet maintaining the surface of the drum at approximately 105° C.

Similar treatment as above described in the case of "Mylar," "Saran" and "Kel-F" films can be given to sheets of any of the hereinbefore mentioned crystalline polymeric materials with correspondingly satisfactory production of differential surface characteristics.

Insofar as the apparatus and methods of treatment hereinbefore described are concerned, it will be understood that they may be utilized for the perforation of other thermoplastic sheet materials or for the formation of structures such as that shown in FIGURE 3, regardless of whether or not such sheet materials are amorphous or crystalline in structure or are capable of co-existing in both a crystalline and an amorphous form. Thus, insofar as operation of the apparatus is concerned, one may also utilize the non-crystalline forms of such materials as polyvinyl resins including polyvinyl chloride, polyvinyl acetate, and co-polymers thereof; polystyrene, polyisobutylene, polyacrylonitrile, and cellulosic film material such as cellulose acetate, cellulose triacetate, cellulose acetate-butyrate, and ethyl cellulose and the amorphous forms of any of the crystalline polymers heretofore described. However, none of these particular materials, after being processed on the apparatus described herein, have the differential crystallinity or the differential heat-sealable characteristics described herein.

FIGS. 5 to 9 are intended as graphic successive representations, in cross-section, of the development of the perforations in a typical substantially crystalline sheet during treatment in the aforementioned apparatus.

At an early stage of melting of the sheet material in areas where it lies over grid perforations, there appears to be a thinning, with usually a rapid development of blistering in the thinned areas so that the sheet has a thinned and somewhat porous membrane 30 extending over each grid void. If the rate of feed through the apparatus is so fast that the thermal effect does not proceed beyond that shown in FIG. 5, one secures finished sheet material on the take-up reel 54 having the characteristics of that shown in FIG. 3.

FIGS. 6 through 9 inclusive, represent the successive effects of longer application of heat to the material overlying the grid voids. This series of figures shows, first the rupture of the material centrally followed by a progressive displacement of the material towards the unmelted areas surrounding the perforation, and taking in general the successive forms of bead-like borders, culminating in the bead 24 depicted in FIG. 9.

Figure 15:
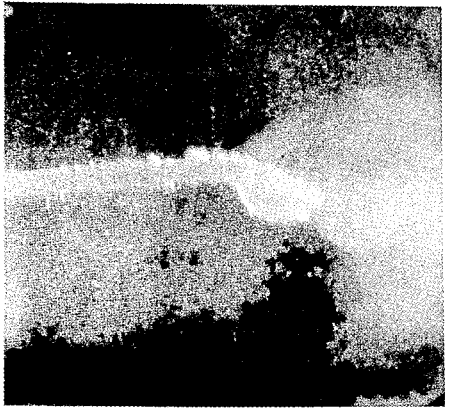
FIG. 15 is a photomicrograph of an edge of a perforation in 1 mil Mylar polyester film, showing the bead 24 in cross-section as depicted in FIG. 9.
Figure 16:
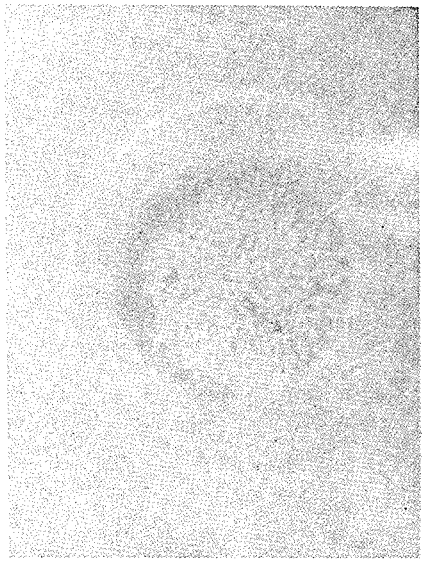
FIG. 16 shows the photomicrograph appearance in plan of the top of a sheet which has been treated to the stage shown in FIGS. 3 and 5.
Figure 17:
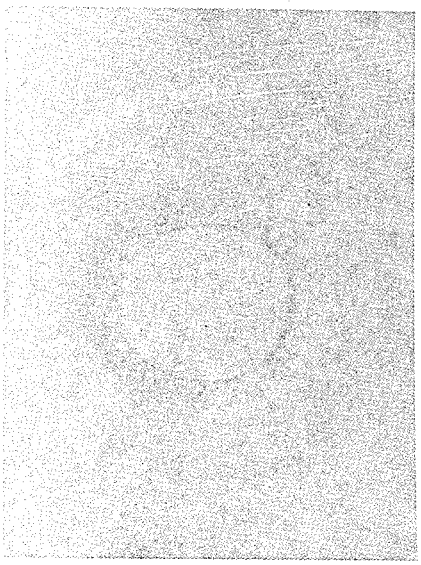
FIG. 17 shows in a similar manner a sheet at a later stage of thermal treatment wherein the perforation has occurred and the blistered material is at a certain stage of retraction towards the surrounding sheet, as in FIG. 6.

As shown in FIG. 11a, a sheet of this invention 22 may be provided with a thin metallic layer 42 of aluminum or other metal which may be painted on one or both sides thereof or coated thereon as by a metal vacuum deposition process, thus giving one or both surfaces a light and heat reflectant quality and rendering the material useful for heat insulation purposes. Alternatively, the layer 42 may be formed of a pigment, painted or otherwise coated onto the Mylar or other suitable crystalline film. If such a pigmented or metallized substantially crystalline sheet is fed through the apparatus of FIG. 4, under conditions normally producing beaded perforation, the metal or pigmented coating, whether on the grid or jet side, or both sides, although it may not be melted, is ruptured in areas overlying the grid voids because of the force and/or velocity of the jet fluid, or because of disruption attendant to the melting of the underlying film. Either surface of the resulting material can be heat sealed in the case of Mylar polyester film at a temperature of 120° C. or more, to other materials, either fibrous or non-fibrous, the disruption of the metal or pigmented coating appearing to be sufficient to expose the beaded areas to materials pressed even against the previously coated surface. Thus FIG. 11a shows a composite comprising a bottom perforated Mylar polyester film or other suitable substantially crystalline sheet 22, having an intervening metallized or pigmented coating 42 thereon, and an overlying lamina 44 of any material, which may or may not be transparent.

If the metallized film is fed to the apparatus with the pigmented or metallized surface on the grid side only, the jet side of the sheet may alternatively be rendered heat-sealable by forming heat-sealable areas of the type shown in FIG. 3, without necessarily disrupting the metallized or pigmented surface. Alternatively, the metal may be fed as a very thin foil, together with a separate sheet of Mylar or other suitable substantially crystalline film, to the apparatus of FIG. 4 to produce a heat-sealed foil-film laminate. The treated sheet material of this invention also may be metallized on at least one side after treatment.

The surprisingly lower softening temperatures (circa 120° C. for Mylar polyester film) of the selected sealable areas 20 of the films of this invention, thus appear to have a common property characterized by a loss of all or a substantial portion of the crystallinity and of any orientation observed in the ordinary samples of suitable substantially crystalline sheets. Therefore, it is likely that the localized heat-treatment heretofore described actually involves a melting of localized areas of the Mylar polyester film or other suitable substantially crystalline sheet material, and in so doing destroys in the areas 20 most if not all of the molecular orientation and crystallinity present, which characteristics, however, persist in the areas 22. The step of quick cooling or quenching of the areas 20 after melting preserves this amorphous-like, disoriented state and thereby the low softening point temperature characteristic of such polymeric material. This hypothesis of actual melting accounts also for bead formation, inasmuch as the shrinkage induced by temperatures near the distortion temperature of Mylar polyester film or other suitable crystalline sheet material accompanied by the pull of the surface tension of the molten polymer should tend to cause a displacement of the melted material towards the relatively cool borders of the surrounding cooler material, thus forming a meniscular bead or grommet.

Whether or not my rationalization of the phenomena attendant the production of the treated sheets of this invention is correct, it is a fact, as indicated by conventional methods of determining crystallinity, including density, infra-red, X-ray diffraction and optical methods, that the selected more readily sealable areas are markedly different from those in the surrounding matrix areas or in the original unprocessed Mylar polyester film or other suitable substantially crystalline sheets. It is also a fact that, where optical observations are applicable, the mode of transmission of polarized light through the selected more readily sealable areas of the sheets of this invention is markedly different from that through the surrounding matrix material or through the original unprocessed Mylar polyester film or other suitable substantially crystalline sheet. Thus, observations can be made by viewing, with suitable magnification, the more readily sealable areas and the surrounding non-sealable or relatively less sealable matrix by means of transmitted light which has been plane-polarized by passage through a light polarizing sheet, such as "Polaroid" film, or through a Nicol prism. The polarized light, which passes through the film containing sealable and non-sealable areas, is then caused to pass through a second plane-polarizing element similar to the first one employed. Rotation of one of the polarizing elements relative to the other will result, in the absence of a film between the polarizing elements, in a change in the intensity of the light transmitted to the eye by the system. The transmitted light will, as is well known, be minimal when the polarizing elements have their axes at 90° to each other. A petrographic microscope is well suited for this type of observation, since it contains suitable polarizing elements as well as the optical magnification needed for objects as minute as some of the forms of the sealable areas of this invention.

When Mylar polyester film and most other suitable substantially crystalline film is so examined, there is no relative adjustment of the polarizing elements at which substantial amounts of light are not transmitted through such a film, and the film appears bright, although there are observable differences in the brightness of such transmitted light depending on the exact relative angular relationship of the polarizing elements. Essentially the same observation is made, when the field of view is restricted to the matrix areas of the products of this invention. If attention is now shifted to the more readily sealable areas of the product, these transmit, quite in contrast, very little light when the polarizing elements have their axes approximately at 90° one to the other, and appear blackened. This is equally true whether one looks at the beads 24 and 24a themselves (FIGS. 2 and 3) or the area 30 within the beads (FIG. 3). Accordingly, these observations support the proposition that matrix areas remain in a state of crystallinity corresponding substantially to that of the original Mylar polyester film or other substantially crystalline sheet and also in the molecularly oriented state of the original sheet, whereas the beaded areas 20 have changed their state of crystallinity and have become amorphous-like and disoriented.

Figure 18:
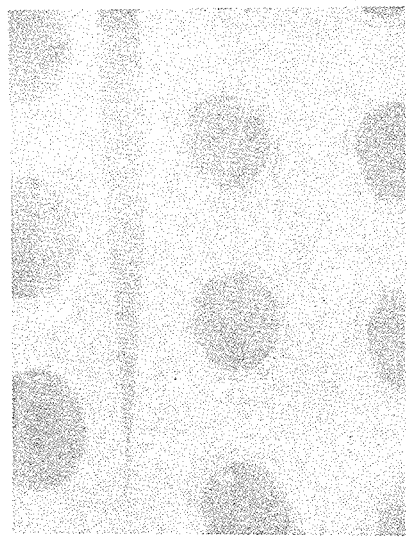

FIG. 18 is a photomicrograph showing at the left the appearance of ¼ mil perforated Mylar polyester film as viewed through crossed Polaroid discs. The three vertical aligned dark areas represent the beaded areas in addition to the perforations through the sheet. Apparently the beaded areas appear darkened because of the changed state of crystallinity in these areas which has occurred as a result of passage through the apparatus. These darkened areas contrast with the brightness of the surrounding matrix 22, away from which heat was so rapidly conducted by the grid during the heat treatment that melting did not occur in these areas.

A further important property of the products of this invention is that either before or after a sealing operation the sheet may be conditioned in such a way that the material of the beaded areas regains a part or sometimes very nearly all of its original physical characteristics as evidenced by its melting point properties and reduced susceptibility to further sealing manipulation, without, however, significantly reducing the effectiveness of the seal already made. This result is achieved by a further thermal treatment of the previously treated film. This thermal treatment step is one which requires a certain amount of time, the exact amount of which varies with the particular sheet treated and the temperature at which the thermal treatment takes place. In the case of a treated Saran film for example, the treated beads regain a melting point approximating the melting point of untreated Saran film in a matter of two hours at normal room temperature. On the other hand, it takes approximately 300 seconds at 120° C. for the material of a treated bead in a sheet derived from ¼ mil Mylar polyester film to regain a melting point of at least 240° C.; approximately 60 seconds at 150° C.; and approximately 20 seconds at 190° C. At room temperature treated Mylar polyester film reverts very slowly as evidenced by the fact that samples over a year old are still heat-sealable. This further thermal treatment of previously treated Mylar polyester film may be carried out by means of a prolonged heat-sealing cycle, so that a heat-sealed laminate of one or more polyethylene terephthalate laminae may have throughout such laminae more nearly the original properties of the Mylar polyester film. The regain periods given above were obtained by employing normal dry heat. Alternatively, the same result may be achieved, coincident with sterilization of the film and the surface to which it is adhered, by subjecting the material to the usual steam sterilization cycle, which takes place at temperatures up to about 120° C. over a period of several hours.

The right-hand sheet shown in the photomicrograph of FIG. 18 is identical with the sheet shown in the left of the photomicrograph except that the former sheet has been subjected to a further heat treatment consisting of placing the sheet for ten minutes in a hot air oven having a temperature of 190° C. As hereinbefore explained, a certain portion of the beaded areas has, as a result of this additional heat treatment, changed its appearance under the crossed Polaroid discs. In this portion of FIG. 18, the dark areas are commensurate with the perforations and the surrounding bordering areas are only slightly darker than the matrix areas, thus indicating that the additional heat treatment has again changed the physical characteristics of the beaded area material, a condition which is further evidenced by the fact that the sheet material on the right of the photomicrograph of FIG. 18 is no longer heat-sealable at temperatures which will heat-seal the material on the left. Tests further indicate that, whereas the entire darkened beaded areas of the left-hand sheet can be dissolved by methylene chloride, a similar solvent treatment of the right-hand sheet has no appreciable effect.

With respect to the relative tensile strength of ¼ mil Mylar polyester film before and after treatment in the apparatus with a grid having holes with a 20 mil diameter occurring approximately 700 per square inch, the loss in tensile strength of the Mylar polyester film is only about 18%. However, the stretch of such a film, as measured on an Instron tensile testing instrument, increases from 100%, in the case of the plain Mylar polyester film, to 130%; and surprisingly enough, in ¼ mil Mylar polyester film it does so irrespective of whether the film has been treated on grids having 20 or 40 mil perforations. The loss in tensile strength is for many purposes further offset by the markedly improved tear resistance. As tested on an Elmendorf tearing tester (8 thicknesses) tear resistance increases from 6 grams on the original ¼ mil Mylar polyester film to 24 grams in the machine direction of the original sheet and increases from 8 grams to 44 grams in the transverse direction. It will thus be seen that the perforated material has increased utility in a variety of uses where tear resistance is of importance, for example, where sewing, pinning, stapling, or any other operation involving further piercing of the film is performed during its fabrication into composite articles.

While the substantially crystalline sheet of FIG. 1 (or FIG. 3) having differential surface areas may be prepared for distribution as a heat-sealable commodity, it should also be understood that the heat-sealing of the sheet to itself or to other material may take place simultaneously with the heat treatment of FIG. 4. Thus, if the localized heat treatment is conducted while one surface of the sheet is in contact with other materials, not deleteriously affected by the localized heat treatment, the resulting product will be a heat-sealed lamination of the substantially crystalline sheet to the other material. This type of operation is particularly acceptable in packaging operations, wherein it is desired to heat-seal two layers, for example of Mylar polyester film, to one another as in the manufacture of heat-sealed packages. If desired, here again the heat-seal operation at reduced temperature may be prolonged to reconvert the beaded areas. The treated surface will then no longer be readily heat-sealable.

Substantially crystalline sheet material as herein used is intended to include other sheet materials besides films, such as substantially crystalline fibers organized into sheet-like materials as by weaving, knitting, molding, carding, by paper-making methods, or otherwise.

It is also understood that, process-wise, products of this invention may be produced by a series of operations, wherein certain selected areas are treated to produce seal-ability in a first operation and intervening or other areas are similarly subsequently treated in a separate operation to impart further sealable areas.

The expressions "substantial crystalline structure" or "substantially crystalline" when used as descriptive of polymeric sheets useful in practicing this invention refer to that degree of crystallinity present in a crystalline polymeric sheet material, when its surface softening of sticking temperature is at least 10° C. above the surface softening or sticking temperature of the same polymer in its amorphous state.

This application is a continuation-in-part of my copending application Serial No. 557,103, filed January 3, 1956.

I claim:

1. A flexible sheet of thermoplastic polymeric material capable of co-existing in both crystalline and amorphous states, certain portions of the material in said sheet being in a substantially crystalline state and having smooth undistorted continuous surfaces having a uniform softening point temperature characteristic of said material in its substantially crystalline state, said portions forming a supporting matrix substantially surrounding and segregating discrete portions of said sheet constituted of the same polymeric material as said matrix, material of said discrete portions exhibiting substantially no crystallinity and having solvent-free softening point temperatures characteristic of said material in its amorphous state and lower than the softening point temperature of the matrix surfaces, said material of said discrete portions extending through the thickness of the sheet.

2. A method of perforating a sheet of flexible thermoplastic polymeric material which comprises subjecting the surface thereof including areas chosen for perforation and areas surrounding such chosen areas to hot gas while simultaneously selectively cooling the areas surrounding said chosen areas, said gas being sufficiently hot to melt through the chosen areas but insufficiently hot to melt the surrounding areas being cooled.

3. A flexible sheet of thermoplastic polymeric material capable of coexisting in both crystalline and amorphous states, certain portions of said sheet having smooth undistorted continuous surfaces being in a substantially crystalline state and having a uniform softening-point temperature characteristic of said material in its substantially crystalline state, perforations in said sheet and beaded edges integral with said portions and constituted of the same polymeric material, surrounding and forming the walls of said perforations, the material constituting and extending through the thickness of said beaded edges exhibiting substantially no crystallinity and having a solvent-free softening-point temperature characteristic of said material in its amorphous state and lower than the softening-point temperature of said portions.

4. The sheet material of claim 3 wherein the thermoplastic material is a terephthalate polyester.

5. The sheet material of claim 4 wherein the terephthalate polyester is a polyethylene terephthalate.

6. The sheet material of claim 5 wherein the polyethylene terephthalate in the substantially crystalline portions is oriented and the polyethylene terephthalate in the beaded edges is disoriented.

7. A flexible sheet of thermoplastic polymeric material capable of co-existing in both crystalline and amorphous states and metallized on at least one surface thereof, portions of thermoplastic polymeric material underlying said metallized surface being in a substantially crystalline state and having a softening-point temperature characteristic of said material in its substantially crystalline state, perforations in said sheet, and beaded edges constituted of the same thermoplastic polymeric material and integral with said portions, surrounding and forming the walls of said perforations and disrupting and projecting through said metallized surface on at least one side thereof, material extending through the thickness of said beaded edges exhibiting substantially no crystallinity and having a solvent-free softening-point temperature characteristic of said polymeric material in its amorphous state and lower than the softening-point temperature of said material in its crystalline state.

8. The method of perforating thermoplastic films comprising supporting said films on a base having intermittent non-film-contacting areas, the base being maintained at a temperature below the softening temperature of said film while the exposed surface of said film is subjected to contact with a fluid at a temperature in excess of the melting temperature of said film.

9. The method of perforating thermoplastic film comprising supporting said film on a perforated base having intermittent non-film-contacting areas, the base being maintained at a temperature below the softening temperature of said film while directing a stream of hot fluid against the film immediately above and adjacent said non-film-contacting areas, the temperature of said fluid being sufficiently above the melting temperature of said film to melt said film directly above the non-film-contacting areas.

10. The method of claim 9 wherein the film is a polyethylene terephthalate film and the fluid is a gas.

11. The method of perforating moving thermoplastic film comprising supporting said film on a moving base including a surface having intermittent non-film-contacting areas, said surface being maintained at a temperature below the softening temperature of said film and passing said moving surface and supported moving film together past a stream of hot gas having a temperature in excess of the melting temperature of said film, said hot gas being progressively in contact with the exposed surface of said film and being sufficiently hot to melt portions of said film as the film moves past.

12. The method of claim 11 in which the stream of hot gas is in the form of a band extending transverse of said moving film.

13. The method of claim 11 wherein the film is a polyethylene terephthalate film.

14. The method of perforating thermoplastic film comprising supporting said film on a base having intermittent non-film-contacting areas, the base being maintained at a temperature below the softening temperature of the film and applying hot gas to the exposed side of the film in areas immediately above said non-film contact areas and in adjacent areas of said exposed side of the film, said hot gas melting said film in areas above said non-film-contacting areas but not above other areas of said base, and maintaining a differential pressure between the sides of said film.

References Cited in the file of this patent

UNITED STATES PATENTS

| | | |
|---|---|---|
| 1,156,928 | Rawley | Oct. 19, 1915 |
| 2,003,494 | Reynolds | June 4, 1935 |
| 2,004,041 | Driver | June 4, 1935 |
| 2,162,229 | Remington | June 13, 1939 |
| 2,248,038 | Adams et al. | July 8, 1941 |
| 2,273,452 | Snyder | Feb. 17, 1942 |
| 2,294,966 | Dreyfuss | Sept. 8, 1942 |
| 2,306,399 | Menzel | Dec. 29, 1942 |
| 2,364,597 | Atwood | Dec. 12, 1944 |
| 2,408,488 | Sorensen | Oct. 1, 1946 |
| 2,441,819 | Jensen | May 18, 1948 |
| 2,467,034 | Hutt | Apr. 12, 1949 |
| 2,475,241 | Hermanson | July 5, 1949 |
| 2,481,602 | Lindh | Sept. 13, 1949 |
| 2,545,243 | Rumsey | Mar. 13, 1951 |
| 2,572,877 | Morris | Oct. 30, 1951 |
| 2,604,423 | Slotterbeck et al. | July 22, 1952 |
| 2,622,053 | Clowe et al. | Dec. 16, 1952 |
| 2,676,120 | Banigan | Apr. 20, 1954 |
| 2,679,469 | Bedford | May 25, 1954 |
| 2,691,208 | Brennan | Oct. 12, 1954 |
| 2,714,571 | Irion et al. | Aug. 2, 1955 |
| 2,719,100 | Banigam | Sept. 27, 1955 |
| 2,735,797 | Schjeldahl | Feb. 21, 1956 |

FOREIGN PATENTS

| | | |
|---|---|---|
| 989,058 | France | May 16, 1951 |